SENSE AMPLIFIER INCLUDING A NEGATIVE RESISTANCE DIODE AND CONTROL CIRCUITRY THEREFOR

Filed June 4, 1962

INVENTOR.
THOMAS R. MAYHEW
BY John V. Regan
ATTORNEY 3,254,305

SENSE AMPLIFIER INCLUDING A NEGATIVE RESISTANCE DIODE AND CONTROL CIRCUITRY THEREFOR

Thomas R. Mayhew, Levittown, N.J., assignor to Radio Corporation of America, a corporation of Delaware Filed June 4, 1962, Ser. No. 199,786
9 Claims. (Cl. 330—24)

This invention relates to amplifiers generally and, in particular, to an arrangement suitable for use as a memory sense amplifier in a digital computer having a high speed memory.

A problem encountered in memory sense amplifiers is that they may become blocked, or paralyzed, by large signals induced in the sense windings during the memory write period. This problem is most prevalent in a system wherein the sense line is used also as the digit write line, as in a word organized memory. The sense signals produced in the sense line as a result of a read pulse usually are many times smaller in amplitude than the signals produced in the sense line as a result of the digit pulse, and the amplifier must respond to these small sense signals. Such blocking reduces the allowable repetition rate since the amplifier must be given sufficient time to recover before reading after a write operation.

A further problem encountered in memory sense amplifiers is that the sense signal may vary in amplitude over wide limits, yet the output of the amplifier must have either a first value or a second value. Also, the output generally must be of greater duration than the sense input signal. Prior art circuit arrangements which overcome these problems generally are complex and require an undesirably large number of components, thereby reducing the reliability and increasing the cost of the system.

Accordingly, it is one object of this invention to provide an improved amplifier.

It is another object of the invention to provide an improved amplifier wherein some of the components perform more than one function, thus reducing the number of components required.

It is a further object of the invention to provide a sense amplifier including a tunnel diode which performs the functions of providing a triggering threshold, current gain and pulse stretching.

It is still another object of the invention to provide an improved amplifier in which the gain is effectively reduced for large input signals.

These and other objects are accomplished according to the invention by the combination of a linear amplifier connected to supply current in the forward direction to a negative resistance diode, preferably a tunnel diode. The quiescent current supplied to the tunnel diode by the amplifier during the sense, or read, period is close to, but less than, the peak current of the tunnel diode. Accordingly, a small input signal of the proper polarity applied to the amplifier at this time increases the forward current of the tunnel diode an amount sufficient to switch the tunnel diode from the low voltage state to the high voltage state. A source of reverse current is connected to the tunnel diode by way of a selectively operable switch means, which is closed except during the sense period. The switch means may be a transistor having a collector-emitter path connected between the source of reverse current and the tunnel diode. The reverse current supplied by the source is greater than the aforesaid forward quiescent current, whereby the tunnel diode is reset to the low voltage state when the switch means is closed. The tunnel diode has a high triggering threshold in this condition and is thus relatively immune to large input signals applied between sense periods.

It is a feature of the invention that the tunnel diode can be completely inhibited from switching between sense periods by limiting the maximum forward current which can be supplied by the linear amplifier to a value which, when combined with the reverse current supplied through the switch means, is less than the peak current of the tunnel diode. The current limiting means introduces a high impedance in the linear amplifier circuit for large input signals. This high impedance provides degeneration, reduced gain, and rapid recovery of the amplifier.

Figures 1, 2, 3, 4:
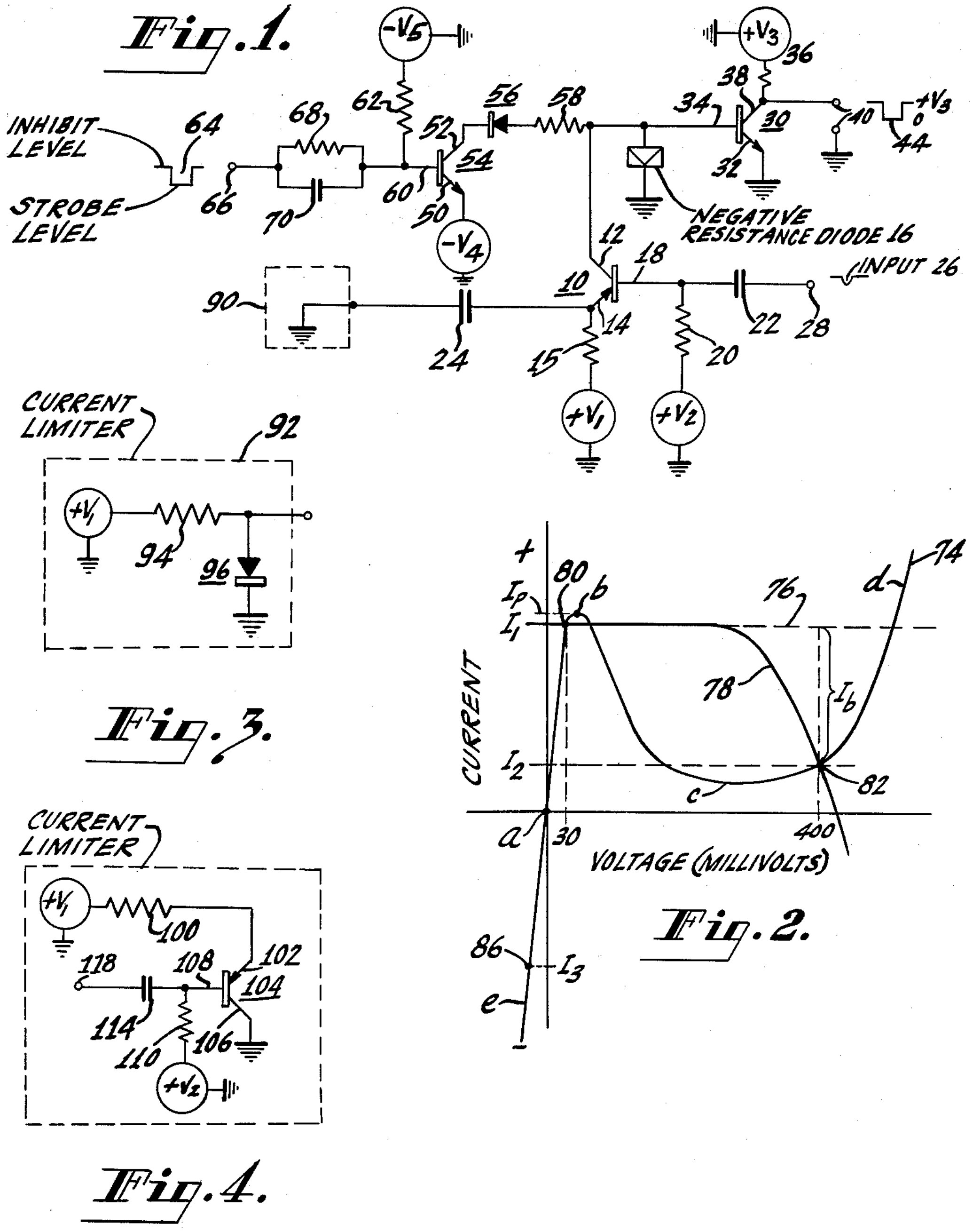
FIGURE 1 is a schematic diagram of the preferred form of sense amplifier according to the invention.
FIGURE 2 is a volt-ampere operating characteristic useful in explaining the operation of the amplifier.
FIGURES 3 and 4 are schematic diagrams of two current limiting means, either of which may be used in the circuit of FIGURE 1.

The sense amplifier includes an input transistor 10 connected to operate as a linear amplifier. The collector 12-emitter 14 path of the transistor 10 is connected in series with a negative resistance diode 16. The diode 16, which is preferably a tunnel diode, has its cathode connected to a point of reference potential, indicated by the conventional symbol for circuit ground. Accordingly, the diode 16 is poled to receive current in a forward direction from the input transistor 10. A source of substantially constant current comprising a resistor 15 and a source of reference potential, designated $+V_1$, is connected between the emitter electrode 14 and circuit ground. Base electrode 18 is connected by way of a resistor 20 to a source of bias potential, designated $+V_2$, which has a value relative to the emitter 14 bias source to quiescently bias the transistor 10 in the active region. In the quiescent condition of the transistor 10, a current equal to the aforesaid constant current minus the base 18 current is supplied to the tunnel diode 16. Input signals 26, which may be output signals of a high speed memory, are coupled to the base electrode 18 through a capacitor 22. The incremental change in transistor 10 current in response to an input signal is supplied by way of a capacitor 24 connected between the emitter electrode 14 and circuit ground. Emitter 14 is A.C. by-passed to circuit ground by the capacitor 24.

An output transistor 30 has its emitter 32-base 34 diode connected in parallel with the tunnel diode 16. The poling of the tunnel diode 16 is such that both the tunnel diode 16 and the emitter 32-base 34 diode pass forward current in the same direction relative to the base electrode 34. A current supply resistor 36 is connected between the collector electrode 38 and a source of collector bias $+V_3$. The output of the circuit is derived across a pair of output terminals 40 connected, respectively, to the collector electrode 38 and circuit ground.

The third transistor 54 acts as an electronic switch. The emitter 50-collector 52 path of transistor 54, a conventional diode 56 and a resistor 58 are serially connected, in the order named, between a source of negative bias potential, designated $-V_4$, and the anode of the tunnel diode 16 to supply a large reverse current to the tunnel diode 16 when the transistor 54 is in the conducting condition. Base electrode 60 of the transistor 54 is connected by way of a resistor 62 of large value to a source of negative bias potential, designated $-V_5$. This bias source and resistor 62 supply $I_{c0}$ current to the transistor 54 in the "off" condition thereof. Input signals 64 for controlling the state of the transistor 54 are coupled to the base electrode 60 by the parallel combination of a resistor 68 and capacitor 70. Normally, the input to the transistor 54 is at a high level, relatively speaking, termed the "inhibit" level. The inhibit level is chosen in value to render the transistor 54 fully conductive. The transistor 54 is rendered nonconductive by application of a negative-going "strobe" signal 64.

Operation of the amplifier may be best understood by a consideration of the volt-ampere characteristic of FIGURE 2. Curve 74 is the volt-ampere characteristic of the tunnel diode 16. The forward current portion of the characteristic 74 includes a first region *ab* of positive resistance at low voltage, a second region *bc* of negative resistance, and a third region of positive resistance *cd* at high voltage, relatively speaking. The reverse current portion of the characteristic 74 has only a linear region *ae* of positive resistance.

The circuit parameters preferably are selected so that, in the absence of an input signal at terminal 28, tunnel diode 16 conducts current in the forward direction only during the strobe period. Strobe signal 64 is applied at the terminal 66 at this time and renders transistor 54 nonconducting. The impedance of the transistor 54, diode 56 and resistor 58 combination then is very high, and its loading effect on the tunnel diode 16 may be neglected. Dashed line 76 represents the loading on the tunnel diode 16 due to the input transistor 10 and its related circuitry. Solid curve 78 is the volt-ampere characteristic looking into the base 34 of output transistor 30. The upper portion of curve 78 is coincident with the dashed line 76 in the vicinity of the ordinate since the transistor 30 is nonconducting when the voltage across its emitter-base diode is close to zero volts.

Curve 78 intersects the operating characteristic 74 at points 80 and 82 in the positive resistance regions *ab* and *cd*, respectively. Both of these points are stable operating points. As is known, the tunnel diode 16 remains in the stable operating state of low voltage (point 80) until the forward current through the tunnel diode 16 is increased above the peak value $I_p$, corresponding to the point *b* on the operating characteristic 74.

Consider now the operation of the circuit and assume first that the transistor 54 is rendered nonconducting by a strobe input signal 64. It is desired that the amplifier be sensitive to small input signals at this time. The input transistor 10 supplies a substantially constant current $I_1$ to the tunnel diode 16, whereby the tunnel diode is biased at the stable operating point 80 (FIGURE 2) in the low voltage region. The current $I_1$ is close to the peak value $I_p$. The voltage across the tunnel diode 16 may be, for example, 30 millivolts, the output transistor 30 is nonconducting and the voltage across the output terminals 40 then is close to $+V_3$ volts. A small, negative input signal 26 applied at the input terminal is coupled by capacitor 22 to the base electrode 18 of the input transistor 10 to increase the emitter 14 current. This increase in current is supplied by the by-pass capacitor 24. Assuming that the collector 12 current increases by an amount greater than $I_p-I_1$, the peak current of the tunnel diode 16 is exceeded and the tunnel diode 16 switches rapidly through its negative resistance region to the stable operating point 82 (FIGURE 2). The voltage across the tunnel diode 16 then may be approximately 400 millivolts, and the emitter 32-base 34 diode of the output transistor 30 is forward biased an amount to drive the transistor 30 into heavy conduction. The voltage across the output terminals 40 then is close to zero volts. The tunnel diode 16 switches to the high voltage state in response to any negative-going input signal which increases the collector 12 current an amount greater than $I_p-I_1$. It is thus seen that the tunnel diode 16 serves as a threshold device. Moreover, once the tunnel diode 16 switches, the voltage at the collector 38 of the output transistor 30 falls to zero volts, regardless of the amplitude of the input signal 26. Thus, the amplitude of the input signal 26 may vary over a wide range.

The tunnel diode 16 serves another important function in the circuit. In general, the width or duration of the input signal 26 may be insufficient to set a storage register. In the FIGURE 1 circuit, the input signal 26 need only be of sufficient duration to switch the tunnel diode 16. The tunnel diode 16 is a high speed device having a switching time of the order of a few nanoseconds. The tunnel diode 16, once switched or set, remains in the set state until it is reset by other means. Accordingly, tunnel diode 16 serves the additional function of pulse stretching. A further function performed by the tunnel diode is that of providing current gain. The current through the tunnel diode is $I_1$ milliamps in the absence of an input signal. Once switched, however, the diode 16 current is $I_2$ milliamps. A current of approximately $I_1-I_2$ is shunted out of the tunnel diode 16 to the transistor 30. This current, designated $I_b$ in FIGURE 2, is substantial compared to the input signal current, and is sufficient to drive the output transistor 30 into saturation.

Transistor 54 becomes fully conductive at the termination of the strobe input signal 64, and a large reverse current for tunnel diode 16 then is supplied through the emitter 50-collector 52 path. The values of the bias source $-V_4$ and the resistor 58 are selected so that this reverse current is considerably larger than the forward current supplied to the tunnel diode 16 by the input transistor 10. For example, the tunnel diode 16 may be reverse biased at the operating point 86 (FIGURE 2) by a reverse current of $|I_3+I_1|$ supplied by transistor 54. This reverse current resets the tunnel diode 16 at the termination of the strobe signal and, additionally, supplies a heavy reverse base current to the output transistor 30 to turn this transistor 30 off rapidly. The output signal 44 then rises from zero to $+V_3$ volts.

The value of the reverse current is selected so as to inhibit switching of the tunnel diode 16 by large transient input signals 26 during the period between successive strobe signals 64. These large signals, as mentioned previously, may be occasioned by digit pulses during a memory write operation, and generally are of much greater amplitude than the sense signals. For the conditions illustrated in FIGURE 2, the collector 12 current of the input transistor 10 must be increased by an amount $I_3+I_p$ milliamps at this time to switch the tunnel diode 16. Tunnel diode 16 may be prevented from switching in response to the maximum amplitude transient input signal 26 by a judicious selection of the reverse current, or by limiting the input transistor 10 current in a manner to be described hereinafter.

The next occurring strobe pulse 64 again renders the transistor 54 nonconducting. Current through tunnel diode 16 reverses direction and increases to a value $I_1$ as the transistor 54 cuts-off. The time required for this reversal of tunnel diode 16 current is determined primarily by the capacitance across the diode and the resistance of the diode 16, and is very short. Tunnel diode 16 may be susceptible to false triggering by noise signals induced on the line between the transistor 54 and the tunnel diode 16 during the period when the transistor 54 is approaching cut-off and the tunnel diode 16 current is approaching $I_1$ millamps. This condition may be especially prevalent when the transistor 54 is located remotely from the tunnel diode 16. To prevent false triggering of the tunnel diode 16, the diode 56 has been included in the collector circuit of the transistor 54. Diode 56 and resistor 58 are located close to the tunnel diode 16. The diode impedance increases sharply as the collector 52 current is reduced close to zero, and the diode 56 then serves as a threshold device isolating the tunnel diode 16 from the line connected to the collector 52. The amplifier now is in condition to respond to small input signals 26.

It should be pointed out that the voltage swing at the collector 12 of the input transistor 10 is limited to a small value by the tunnel diode 16, thereby minimizing the negative feedback from collector 12 to base 18. The input transistor 10 serves two important functions: first, it provides a high gain A.C. path for input signals 26; second, it supplies the D.C. bias current for the tunnel diode 16 during the strobe period. This transistor 10 operates at a high enough current level so that its gain-bandwidth product is high. For example, a tunnel diode 16 having a peak current $I_p$ of 5 milliamps can be biased quiescently at 4.2 milliamps by the transistors 10. A transistor such as the 2N769 has a typical gain-bandwidth product of 800 mc. at 4.2 milliamps and 5 volts.

The circuit as a whole is inherently fast since the input signal passes through a broadband linear amplifier, a tunnel diode threshold circuit and a saturated output transistor, which generally need drive only one unit load. This circuit is relatively simple as compared to known prior art circuits for the reason that some of the stages perform several functions, as described above.

The sense amplifier may be completely inhibited when the tunnel diode 16 is biased at point 86 (FIGURE 2), between strobe periods, if the maximum possible increase in current through input transistor 10 is limited to a value less than $I_3+I_p$ milliamps. One method of accomplishing this end is to replace the dashed box 90 of FIGURE 1 by the circuitry within the dashed box 92 of FIGURE 3. The circuit of FIGURE 3 includes a resistor 94 having one end connected to a source of positive potential, designated $+V_1$. The other end of the resistor 94 may be connected to the left-hand plate of the by-pass capacitor 24 (FIGURE 1). A diode 96 is connected between the latter end of the resistor 94 and circuit ground. Resistor 94 and bias source $+V_1$ act as a source of constant current. This current, in the absence of an input signal 26, is supplied to the diode 96. The increase in emitter 14 current due to a large input signal 26 is limited to the constant current supplied by this source, and may be adjusted to be less than $I_3+I_p$ milliamps. Moreover, when all of the current is switched out of the diode 96, the diode 96 is rendered nonconductive and effectively places a high impedance in the emitter 14 circuit. This high impedance provides a large amount of degeneration and reduces the gain of the linear amplifier for large input signals 26.

An alternative current limiting circuit which may be used in the FIGURE 1 arrangement is illustrated schematically in FIGURE 4. This circuit includes a resistor 100 which may be connected between the left-hand terminal of the by-pass capacitor 24 and a source of bias $+V_1$ volts. The resistor 100 and bias source $+V_1$ serve as a source of constant current which normally flows into the emitter 102 of transistor 104. The collector 106 of this transistor 104 is grounded. The base electrode 108 is forward biased relative to the emitter 102 by way of a resistor 110 connected to a source of bias, designated $+V_2$. Operation of this current limiter, as thus far described, is similiar to that of the FIGURE 3 circuit, and the incremental increase in emitter 14 current is limited to a value determined by the values of the resistor 100 and bias source $+V_1$.

An additional feature of the FIGURE 4 circuit is that a capacitor 114 may be connected between the base electrode 108 and an input terminal 118. If the input signal is applied between this input terminal 118 and the input terminal 28 of the transistor 10, then the linear amplifier acts as a difference amplifier and will have common mode rejection characteristics. The amplifier will be able to detect a negative signal at the input of transistor 10 or a positive input signal at input terminal 118 but will not be sensitive to equal amplitude signals of the same polarity at these inputs.

By way of illustration only, a sense amplifier which includes the current limiter of FIGURE 3 may have the following values when used with a 1N3128 tunnel diode:

| | | |
|---|---|---|
| Resistors: | | |
| 15 | ohms | 1.2K |
| 20 | do | 1.0K |
| 36 | do | 820 |
| 58 | do | 270 |
| 62 | do | 56K |
| 68 | do | 1.2K |
| 94 | do | 2.4K |
| Capacitors: | | |
| 22 | farads | 4.7$\mu$ |
| 24 | do | 3.3$\mu$ |
| 70 | do | 12$\mu\mu$ |
| Diodes: | | |
| 56 and 96 | | S564G |
| Transistors: | | |
| 10 | | 2N769 |
| 30 | | 2N955 |
| 54 | | 2N834 |
| Voltages: | | |
| $V_1$ | volts | 10 |
| $V_2$ | do | 5 |
| $V_3$ | do | 5 |
| $V_4$ | do | 3 |
| $V_5$ | do | 20 |

Although the sense amplifier of FIGURE 1 has been illustrated as utilizing a PNP transistor in the linear amplifier circuit and NPN transistors in the strobe and output circuits, it will be apparent to those skilled in the art that transistors of opposite conductivity type may be employed. In the latter event, it is necessary to reverse the connections to the tunnel diode 16, conventional diode 56 and the various bias sources. Other modifications may be made also without departing from the spirit of the invention.

What is claimed is:

1. The combination comprising:
a negative resistance diode having a volt-ampere characteristic defined by two regions of positive resistance separated by a region of negative resistance;
a transistor having a collector-emitter path connected in a circuit path across said negative resistance diode in a direction to conduct current in a forward direction to said negative resistance diode;
means for applying input signals to the base electrode of said transistor;
normally closed switch means;
a bias source connected in a circuit path across said negative resistance diode by way of said switch means and being poled to supply reverse current to said negative resistance diode;
and means operable to open said switch means intermittently.

2. The combination comprising:
a negative resistance diode having a forward volt-ampere characteristic defined by two regions of positive resistance separated by a region of negative resistance;
said negative resistance diode having a peak current $I_p$ and a valley current $I_v$;
a transistor connected in a circuit path across said negative resistance diode in a direction to conduct forward current to said negative resistance diode;
means quiescently biasing said transistor so that a total quiescent forward current $I_1<I_p$ is supplied to said negative resistance diode;
means for applying input signals to said transistor;
means connected in a circuit path across said negative resistance diode and supplying a reverse current $>|I_1-I_v|$ to said negative resistance diode;
and means operable to intermittently interrupt the flow of said reverse current to said negative resistance diode.

3. The combination comprising:
an output transistor connected in the common emitter configuration and having an emitter-base diode;
a negative resistance diode connected across said emitter-base diode and being poled to pass forward current in the same direction, relative to the base, as said emitter-base diode;
said negative resistance diode having a forward volt-ampere characteristic defined by two regions of positive resistance separated by a region of negative resistance;
an input transistor having a collector-emitter path connected in a circuit path across said negative resistance diode in a direction to conduct forward current to said negative resistance diode;
means for applying input signals to the base of said input transistor;
a source of reverse current connected in a circuit path across said negative resistance diode and normally supplying reverse current of greater magnitude than the quiescent current supplied to said negative resistance diode by said input transistor;
and means operable to intermittently disconnect said source from said negative resistance diode.

4. The combination comprising:
an output transistor having an emitter-base diode;
a tunnel diode connected in parallel with said emitter-base diode and poled to pass forward current in the same direction, relative to the base, as said emitter-base diode;
an input transistor having a collector-emitter path connected in a first circuit path across said tunnel diode to conduct forward current to said tunnel diode;
means for applying input signals to the base of said input transistor;
a source of reverse current connected in a second, normally closed circuit path across said tunnel diode and supplying to said tunnel diode a reverse current of greater magnitude than the quiescent current supplied to said tunnel diode by said input transistor;
and means operable intermittently to electrically open said second circuit path.

5. The combination comprising:
an output transistor connected in the common emitter configuration and having an emitter-base diode;
a negative resistance diode connected across said emitter-base diode and being poled to pass forward current in the same direction, relative to the base, as said emitter-base diode;
said negative resistance diode having a forward volt-ampere characteristic defined by two regions of positive resistance separated by a region of negative resistance;
an input transistor having a collector-emitter path connected in a circuit across said negative resistance diode to conduct current in the forward direction to said negative resistance diode;
means for applying input signals to the base of said input transistor;
a source of reverse current of magnitude greater than the forward current supplied to said negative resistance diode by way of the collector-emitter path of said input transistor in the absence of an input signal;
normally closed switch means connecting said source of reverse current in a circuit across said negative resistance diode;
and means for intermittently opening said switch means.

6. The combination comprising:
an output transistor of one conductivity type having an emitter-base diode and having its emitter connected to a point of reference potential;
a negative resistance diode connected across said emitter-base diode and poled to conduct forward current in the same direction, relative to the base, as said emitter-base diode;
said negative resistance diode having a forward volt-ampere characteristic defined by a first region of positive resistance at low voltage, relatively speaking, a second region of positive resistance at high voltage, relatively speaking, and a region of negative resistance intermediate said first and second regions of positive resistance, said negative resistance diode having a peak current $I_p$ in said region of low voltage;
an input transistor of the opposite conductivity type having a collector electrode connected to the base of said output transistor, an emitter electrode and a base electrode,
a source of substantially constant current connected between the emitter electrode of said input transistor and said point of reference potential;
means coupled between the base electrode of said input transistor and said point of reference potential for quiescently biasing said input transistor in the active region;
a capacitor having one terminal connected to the emitter electrode of said input transistor;
current supply means connected to the other terminal of said capacitor;
means for supplying input signals to the base electrode of said input transistor;
a source of reverse current;
normally closed switch means connecting said source of reverse current in a circuit across said negative resistance diode;
and means for opening and then reclosing said switch means.

7. The combination comprising:
a negative resistance diode having a forward volt-ampere characteristic defined by two regions of positive resistance separated by a region of negative resistance;
a junction point and a point of reference potential;
means connecting said diode between said junction point and said point of reference potential so that said diode is switched through its negative resistance region in response to a net current, greater than a predetermined value and of a first polarity, applied at said junction point;
a source of variable signal current of said first polarity connected at said junction, said source including a transistor having an output electrode connected to said junction point, a common electrode connected to said point of reference potential, and an input electrode, and means for applying input signals between said input and common electrodes;
a second source of current of amplitude at least as great as said signal current and of opposite polarity operatively connected between said point of reference potential and said junction point; and
means for intermittently interrupting the flow of current from said second source to said negative resistance diode.

8. The combination comprising:
a negative resistance diode having a peak current $I_p$ and a valley current $I_v$, and having a forward volt-ampere characteristic defined by two regions of positive resistance separated by a region of negative resistance;
signal responsive means connected in a circuit across said diode in a direction to supply current in the forward direction to said diode;
a transistor having a collector-emitter path connected in a circuit across said diode in a direction to conduct current in the reverse direction to said diode;
means quiescently biasing said transistor to supply reverse current to said diode in greater quantum than the total of the quiescent forward current supplied to said negative resistance diode less the value $I_v$; and means for applying input signals at the base of said transistor, said signals having a polarity and magnitude to bias said transistor in a substantially non-conducting condition.

9. The combination comprising:

a negative resistance diode having a forward volt-ampere characteristic defined by two regions of positive resistance separated by a region of negative resistance;

output means connected in circuit across said negative resistance diode;

a transistor having a collector-emitter path connected in a circuit path across said negative resistance diode in a direction to conduct current in the forward direction to said negative resistance diode;

means for applying input signals to the base of said transistor;

normally closed switch means;

a source of reverse current connected in a circuit path across said negative resistance diode by way of said normally closed switch means, said source supplying a reverse current of greater magnitude than the quiescent forward current supplied to said negative resistance diode;

and signal responsive means intermittently operable to open said switch means.

References Cited by the Examiner

UNITED STATES PATENTS

| | | |
|---|---|---|
| 3,054,002 | 9/1962 | Tendick. |
| 3,103,597 | 9/1963 | Novick et al. |
| 3,105,957 | 10/1963 | Li. |
| 3,127,526 | 3/1964 | Bishop. |

OTHER REFERENCES

Article by Lesk and Suran, "Tunnel Diode Operation and Application," Electrical Engineering, vol. 79, No. 4, April 1960, pp. 270–277.

ROY LAKE, *Primary Examiner.*

N. KAUFMAN, *Assistant Examiner.*